US011526455B2

(12) United States Patent
Kang et al.

(10) Patent No.: US 11,526,455 B2
(45) Date of Patent: Dec. 13, 2022

(54) SLAVE DEVICES AND SLAVE APPARATUS FOR DESIGNATING ADDRESS USING A SINGLE PIN

(71) Applicant: SAMSUNG ELECTRO-MECHANICS CO., LTD., Suwon-si (KR)

(72) Inventors: Jin Yong Kang, Suwon-si (KR); Yo Sub Moon, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 22 days.

(21) Appl. No.: 17/192,096

(22) Filed: Mar. 4, 2021

(65) Prior Publication Data
US 2022/0147475 A1    May 12, 2022

(30) Foreign Application Priority Data
Nov. 6, 2020    (KR) .................. 10-2020-0147446

(51) Int. Cl.
*G06F 13/20* (2006.01)
*G06F 13/40* (2006.01)
*G06F 13/42* (2006.01)

(52) U.S. Cl.
CPC .......... *G06F 13/20* (2013.01); *G06F 13/4022* (2013.01); *G06F 13/4282* (2013.01)

(58) Field of Classification Search
CPC ... G06F 13/20; G06F 13/4022; G06F 13/4282
(Continued)

(56) References Cited

U.S. PATENT DOCUMENTS 6,034,995 A *  3/2000  Eisele ................. H04L 25/08
                                                     370/242
7,958,286 B2 *  6/2011  Bresemann .......... H01L 23/544
                                                     710/10
(Continued)

FOREIGN PATENT DOCUMENTS

EP        1696568 A1 *  8/2006  ......... H03K 19/1732
KR    10-2009-0111012 A   10/2009
(Continued)

OTHER PUBLICATIONS

Korean Office Action dated Mar. 3, 2022 in corresponding Korean Patent Application No. 10-2020-0147446. (4 pages in English and 3 pages in Korean).

*Primary Examiner* — Idriss N Alrobaye
*Assistant Examiner* — Henry W Yu
(74) *Attorney, Agent, or Firm* — NSIP Law

(57) ABSTRACT

A slave device includes: a serial communications slave having an address designated for performing serial communications with a master; a single address determination pin configured to be, selectively, connected to a power terminal without being connected to a first external resistor, connected to a ground terminal without being connected through a second external resistor, connected to the power terminal through the first external resistor, or connected to the ground terminal through a second external resistor; and an address allocator configured to designate the address of the serial communications slave based on a plurality of state bits determined depending on a connection state of the single address determination pin.

20 Claims, 5 Drawing Sheets

(58) Field of Classification Search
USPC .......... 710/3, 8, 9, 16, 38, 62, 316; 370/244, 370/250
See application file for complete search history.

(56) References Cited

U.S. PATENT DOCUMENTS

| | | | |
|---|---|---|---|
| 10,817,451 B1* | 10/2020 | Tabuchi | G06F 13/4022 |
| 2008/0042701 A1* | 2/2008 | Weiss | H05K 1/0266 |
| | | | 327/143 |
| 2009/0261998 A1 | 10/2009 | Chae et al. | |
| 2009/0327540 A1* | 12/2009 | Robertson | G06F 13/4226 |
| | | | 710/110 |
| 2010/0148852 A1* | 6/2010 | Jiang | G01C 9/10 |
| | | | 327/516 |
| 2011/0055442 A1* | 3/2011 | Ward | G05B 19/0421 |
| | | | 710/110 |
| 2013/0132626 A1* | 5/2013 | Furlan | G06F 13/385 |
| | | | 710/110 |
| 2014/0164660 A1* | 6/2014 | DeCesaris | G06F 13/4291 |
| | | | 710/113 |
| 2016/0357697 A1* | 12/2016 | Landmann | G06F 13/4068 |
| 2017/0132170 A1* | 5/2017 | Smith | G06F 13/4068 |
| 2019/0079130 A1* | 3/2019 | Ko | G01R 31/69 |
| 2019/0272248 A1* | 9/2019 | Metzner | G06F 13/4022 |

FOREIGN PATENT DOCUMENTS

| | | |
|---|---|---|
| KR | 10-2012-0059584 A | 6/2012 |
| KR | 10-1222107 B1 | 1/2013 |
| KR | 10-2019-0097809 A | 8/2019 |

\* cited by examiner

|  | NI ||| ASEL1 | ASEL0 |
|---|---|---|---|---|---|
|  | PU OFF, PD OFF | PU ON, PD OFF | PU OFF, PD ON |  |  |
| FIRST ADDRESS TCOM. CONNECTED TO T1 | 1 | 1 | 1 | 0 | 0 |
| SECOND ADDRESS TCOM. CONNECTED TO T2 | 0 | 0 | 0 | 0 | 1 |
| THIRD ADDRESS TCOM. CONNECTED TO T3 ($R21 \geq 2 \times R12$) | 1 | 1 | 0 | 1 | 0 |
| FOURTH ADDRESS TCOM. CONNECTED TO T4 ($R22 \geq 2 \times R11$) | 0 | 1 | 0 | 1 | 1 |

FIG. 4

SLAVE DEVICES AND SLAVE APPARATUS FOR DESIGNATING ADDRESS USING A SINGLE PIN

CROSS-REFERENCE TO RELATED APPLICATIONS

This application claims the benefit under 35 U.S.C. § 119(a) of Korean Patent Application No. 10-2020-0147446 filed on Nov. 6, 2020 in the Korean Intellectual Property Office, the entire disclosure of which is incorporated herein by reference for all purposes.

BACKGROUND

1. Field

The following description relates to slave devices and a slave apparatus for designating an address using a single pin.

2. Description of Related Art

In general, serial communications may include inter-integrated circuit (I2C or IIC) communications. The I2C communications may make multi-communications possible by connecting a plurality of slave devices to a single master device, and thus, several slave devices may be used.

For example, an I2C communications apparatus may be implemented by connecting several slave devices to one master device, and each slave device may use its own address and communicate with the master device when receiving its address allocated by the master device.

To allocate respective I2C addresses to the plurality of slave devices, there is a method in which different addresses are respectively allocated to the slave devices using external pins, or a method in which a serial clock terminal SCL and serial data terminal SDA are interchangeably connected to each other. These methods may each be a way to distinguish two addresses from each other.

However, the conventional method, in which the respective I2C addresses are allocated using the external pins, is only able to allocate two addresses and is unable to allocate three or more slave devices, using a single pin.

In addition, it is possible to allocate the addresses to up to four slave devices when using two pins. However, such an address designation method using pins may increase the number of external pins as the number of devices to be address-designated is increased, and usage such an address designation method may thus be limited in an environment in which the number of pins is limited.

Therefore, in an implementation in which a plurality of cameras are mounted on a smartphone, a vehicle or the like, there is an increasing need for a development of address designation technology in which a plurality of slave devices mounted on the plurality of cameras and one master device mounted on a control apparatus may smoothly communicate with each other.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a slave device includes: a serial communications slave having an address designated for performing serial communications with a master; a single address determination pin configured to be, selectively, connected to a power terminal without being connected to a first external resistor, connected to a ground terminal without being connected through a second external resistor, connected to the power terminal through the first external resistor, or connected to the ground terminal through a second external resistor; and an address allocator configured to designate the address of the serial communications slave based on a plurality of state bits determined depending on a connection state of the single address determination pin.

The address allocator may include: a first internal resistor having one end connected to the power terminal; a second internal resistor having one end is connected to the ground terminal; a first switch connected between another end of the first internal resistor and the single address determination pin; a second switch connected between another end of the second internal resistor and the single address determination pin; and a state determiner configured to control the first switch and the second switch, and designate the address based on a voltage level of the single address determination pin that is determined based on the control of the first switch and the second switch.

The state determiner may be further configured to: firstly, control the first and second switches to be in an OFF-OFF state by using first and second control signals and read the voltage level of the single address determination pin; secondly, control the first and second switches to be in an ON-OFF state and read the voltage level of the single address determination pin; thirdly, control the first and second switches to be in an OFF-ON state and read the voltage level of the single address determination pin; and fourthly, set voltage levels of first and second address selection signals for designating the address based on the read voltage level of the single address determination pin.

In a state in which the single address determination pin is connected to the power terminal to designate a first address, and in response to the voltage level of the single address determination pin sequentially corresponding to logic levels "1,1,1", the state determiner may set the first and second address selection signals to logic levels "0,0" corresponding to the first address.

In a state in which the single address determination pin is connected to the ground terminal to designate a second address, and in response to the voltage level of the single address determination pin sequentially corresponding to logic levels "0,0,0", the state determiner may set the first and second address selection signals to logic levels "0,1" corresponding to the second address.

In a state in which the single address determination pin is connected to the power terminal through the first external resistor to designate a third address, and in response to the voltage level of the single address determination pin sequentially corresponding to logic levels "1,1,0", the state determiner may set the first and second address selection signals to logic levels "1,0" corresponding to the third address. The first external resistor may have a resistance value that is greater than or equal to twice a resistance value of the second internal resistor.

In a state in which the single address determination pin is connected to the ground terminal through the second external resistor to designate a fourth address, and in response to the voltage level of the single address determination pin sequentially corresponding to logic levels "0,1,0", the state determiner may set the first and second address selection signals to logic levels "1,1". The second external resistor may have a resistance value that is greater than or equal to twice a resistance value of the first internal resistor.

In another general aspect, a slave apparatus includes at least three among four slave devices. The four slave devices include: a first slave device including a first single address determination pin connected to a power terminal, wherein the first slave device is configured to control a voltage level of the first single address determination pin, and designate a first address for performing serial communications with a master based on the voltage level of the first single address determination pin; a second slave device including a second single address determination pin connected to a ground terminal, wherein the second slave device is configured to control a voltage level of the second single address determination pin, and designate a second address for performing the serial communications with the master based on the voltage level of the second single address determination pin; a third slave device including a third single address determination pin connected to the power terminal through a first external resistor, wherein the third slave device is configured to control a voltage level of the third single address determination pin, and designate a third address for performing the serial communications with the master based on the voltage level of the third single address determination pin; and a fourth slave device including a fourth single address determination pin connected to the ground terminal through a second external resistor, wherein the fourth slave device is configured to control a voltage level of the fourth single address determination pin, and designate a fourth address for performing the serial communications with the master based on the voltage level of the fourth single address determination pin.

Each of the first, second, third, and fourth slave devices may include: a serial communications slave having an address is designated for performing the serial communications with the master; and an address allocator configured to designate the address of the serial communications slave based on a plurality of state bits determined depending on a connection state of a corresponding one of the first, second, third, and fourth single address determination pins.

The address allocator may include: a first internal resistor having one end connected to the power terminal; a second internal resistor having one end connected to the ground terminal; a first switch connected between another end of the first internal resistor and the corresponding one of the first, second, third, and fourth single address determination pins; a second switch connected between the other end of the second internal resistor and the corresponding one of the first, second, third, and fourth single address determination pins; and a state determiner configured to control the first switch and the second switch, and designate the address based on the voltage level of the corresponding one of the first, second, third, and fourth single address determination pins, the voltage level of the corresponding one of the first, second, third, and fourth single address determination pins being determined based on the control of the first switch and the second switch.

The state determiner may be further configured to: firstly, control the first and second switches to be in an OFF-OFF state and read the voltage level of the corresponding one of the first, second, third, and fourth single address determination pins; secondly, control the first and second switches to be in an ON-OFF state and read the voltage level of the corresponding one of the first, second, third, and fourth single address determination pins; thirdly, control the first and second switches to be in an OFF-ON state and reads the voltage level of the corresponding one of the first, second, third, and fourth single address determination pins; and fourthly, set voltage levels of first and second address selection signals for designating the address based on the read voltage level of the corresponding one of the first, second, third, and fourth single address determination pins.

The state determiner may set the first and second address selection signals to logic levels "0,0", in response to the voltage level of the first single address determination pin sequentially corresponding to logic levels "1,1,1".

The state determiner may set the first and second address selection signals to logic levels "0,1", in response to the voltage level of the second single address determination pin sequentially corresponding to logic levels "0,0,0".

The state determiner may set the first and second address selection signals to logic levels "1,0", in response to the voltage level of the third single address determination pin sequentially corresponding to logic levels "1,1,0". The first external resistor may have a resistance value that is greater than or equal to twice a resistance value of the second internal resistor.

The state determiner may set the first and second address selection signals to logic levels "1,1", in response to the voltage level of the fourth single address determination pin sequentially corresponding to logic levels "0,1,0". The second external resistor may have a resistance value that is greater than or equal to twice a resistance value of the first internal resistor.

The slave apparatus may further include a pin switch connected to each of the first, second, third and fourth slave devices. The pin switch may connect a common terminal connected to the first single address determination pin to a first terminal for a first address designation, connect a common terminal connected to the second single address determination pin to a second terminal for a second address designation, connect a common terminal connected to the third single address determination pin to a third terminal for a third address designation, and connect a common terminal connected to the fourth single address determination pin to a fourth terminal for a fourth address designation. The first terminal may be connected to the power terminal. The second terminal may be connected to the ground terminal. The third terminal may be connected to the power terminal through the first external resistor. The fourth terminal may be connected to the ground terminal through the second external resistor.

In another general aspect, a slave device includes: a serial communications slave having an address designated for performing serial communications with a master; a single address determination pin; and a pin switch. The pin switch includes: a common terminal connected to the single address determination pin; a first terminal connected to a power terminal; a second terminal connected to a ground terminal; a third terminal connected to the power terminal through a first external resistor; and a fourth terminal connected to the ground terminal through a second external resistor. The slave device is configured to designate the address of the serial communications slave based on a plurality of state bits determined depending on connection states of the common terminal with respect to the first terminal, the second terminal, third terminal, and the fourth terminal.

No resistor may be disposed in a path connecting the first terminal to the power terminal. No resistor may be disposed in a path connecting the second terminal to the ground terminal.

The slave device may be further configured to selectively connect the common terminal to each of the first terminal, the second terminal, third terminal, and the fourth terminal.

The slave device may further include: a first internal resistor connected to the power terminal; a second internal resistor connected to the ground terminal; a first switch connected to the first internal resistor and the single address determination pin; and a second switch connected to the second internal resistor and the single address determination pin. The slave device may be further configured to configured to control the first switch and the second switch to vary a voltage level of the single address determination pin, and designate the address based on the voltage level.

Other features and aspects will be apparent from the following detailed description, the drawings, and the claims.

BRIEF DESCRIPTION OF DRAWINGS

FIG. 4 is a schematic diagram of first and second address selection signals for designating a first address, a second address, a third address and a fourth address, based on a voltage state of a single address determination pin (external pin), according to an embodiment.

Throughout the drawings and the detailed description, the same reference numerals refer to the same elements. The drawings may not be to scale, and the relative sizes, proportions, and depictions of elements in the drawings may be exaggerated for clarity, illustration, and convenience.

DETAILED DESCRIPTION

Figure 1:
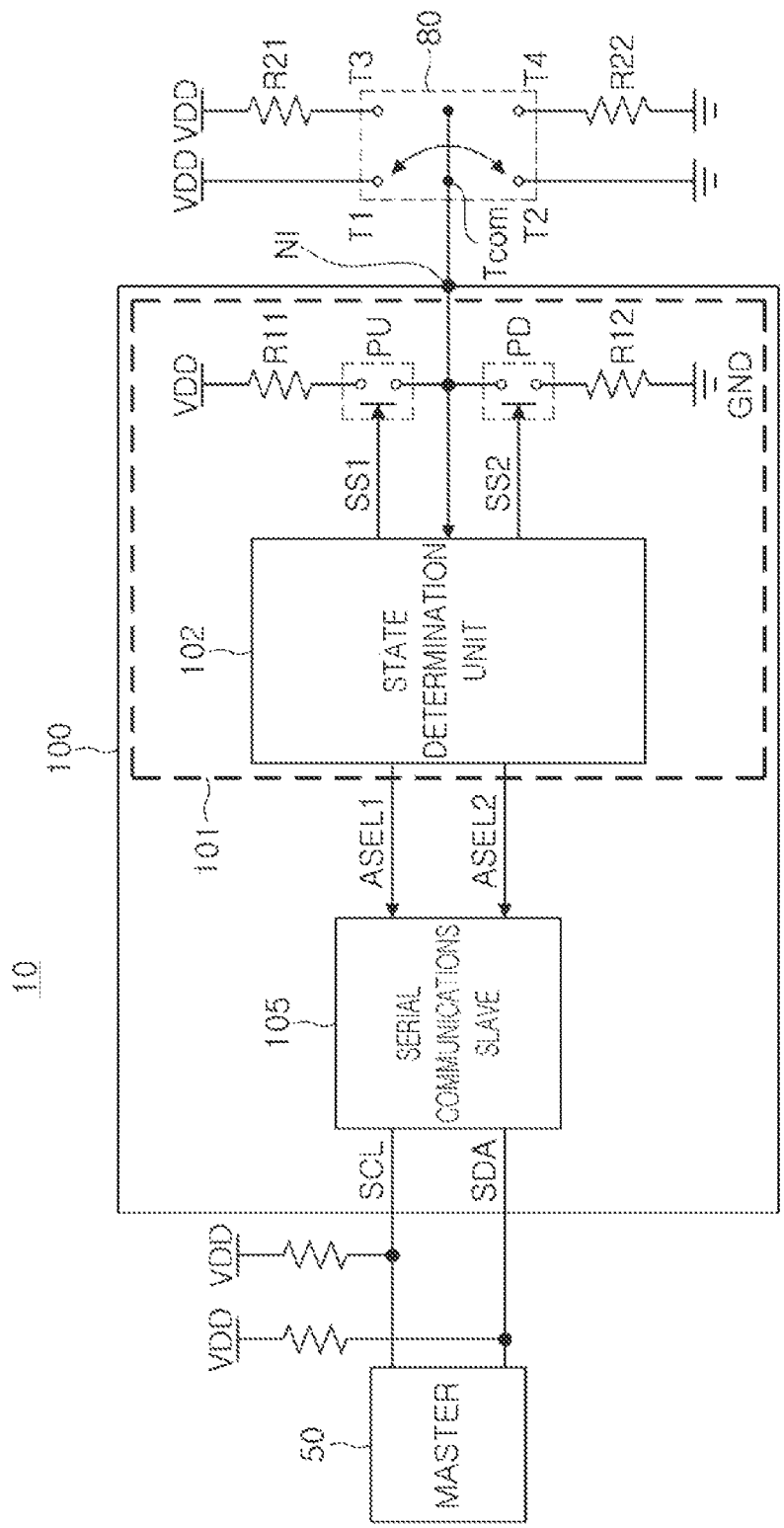
FIG. 1 is a schematic diagram of a slave device, according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure. Hereinafter, while embodiments of the present disclosure will be described in detail with reference to the accompanying drawings, it is noted that examples are not limited to the same.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. As used herein "portion" of an element may include the whole element or less than the whole element.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may be also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of this disclosure. Further, although the examples described herein have a variety of configurations, other configurations are possible as will be apparent after an understanding of this disclosure.

Herein, it is noted that use of the term "may" with respect to an example, for example, as to what an example may include or implement, means that at least one example exists in which such a feature is included or implemented while all examples are not limited thereto.

FIG. 1 is a schematic diagram of a slave device 100, according to an embodiment.

Referring to FIG. 1, the slave device 100 may include, for example, a serial communications slave 105, a single address determination pin NI, and an address allocation unit, or address allocator, 101.

The serial communications slave 105 may receive an address allocated by a state determination unit, or state determiner, 102 for performing serial communications with a communications master 50 (hereafter, "master") of a master device.

The single address determination pin NI may be connected to either one of a power terminal VDD and a ground terminal GND, or connected to the power terminal VDD through a first external resistor R21 or the ground terminal GND through a second external resistor R22. The description below describes this connection in more detail.

The address allocation unit 101 may designate the address of the serial communications slave 105 based on a plurality of state bits determined depending on a connection state of the single address determination pin NI.

In addition, for example, the address allocation unit 101 may include: a first internal resistor R11; a second internal resistor R12; a first switch PU; a second switch PD; and the state determination unit 102.

One end of the first internal resistor R11 may be connected to the power terminal VDD and the other end of the first internal resistor R11 may be connected to the first switch PU. For example, the first internal resistor R11 may be a pull-up resistor.

One end of the second internal resistor R12 may be connected to the ground terminal GND and the other end of the second internal resistor R12 may be connected to the second switch PD. For example, the second internal resistor R12 may be a pull-down resistor.

The first switch PU may be connected between the other end of the first internal resistor R11 and the single address determination pin NI, and may be operated in an ON state or an OFF state based on a control of the state determination unit 102.

The second switch PD may be connected between the other end of the second internal resistor R12 and the single address determination pin NI, and may be operated in the ON state or the OFF state based on the control of the state determination unit 102.

The state determination unit 102 may control the first switch PU and the second switch PD, and designate the address based on a voltage level of the single address determination pin NI, determined based on the control. A more detailed description of operation of the state determination unit 102 is provided below.

The state determination unit 102 may primarily (or, firstly) control the first and second switches PU and PD to be in an OFF-OFF state by using first and second control signals SS1 and SS2 and read the voltage level of the single address determination pin NI to set a first state bit, secondly control the first and second switches PU and PD to be in an ON-OFF state and read the voltage level of the single address determination pin NI to set a second state bit, and thirdly control the first and second switches PU and PD to be in an OFF-ON state and read the voltage level of the single address determination pin NI to set a third state bit.

Next, the state determination unit 102 may set the voltage levels of the first and second address selection signals ASEL1 and ASEL2 for designating the address of the serial communications slave 105, based on the first, second, and third state bits based on the read voltage levels of the single address determination pin NI.

For example, a slave apparatus 10 may include the slave device 100 and a pin switch 80. The pin switch 80 may connect a common terminal Tcom connected to the single address determination pin NI to a first terminal T1 for a first address designation, connect the common terminal Tcom to a second terminal T2 for a second address designation, connect the common terminal Tcom to a third terminal T3 for a third address designation, and connect the common terminal Tcom to a fourth terminal T4 for a fourth address designation.

The first terminal T1 may be connected to the power terminal VDD without a resistor (e.g., a first external resistor), the second terminal T2 may be connected to the ground terminal GND without a resistor (e.g., a second external resistor), the third terminal T3 may be connected to the power terminal VDD through the first external resistor R21, and the fourth terminal T4 may be connected to the ground terminal GND through the second external resistor R22.

For example, the first external resistor R21 may be set to have a resistance value (2×R12) that is twice or more than a resistance value of the second internal resistor R12. The second external resistor R22 may be set to have a resistance value (2×R11) that is twice a resistance value of the first internal resistor R11 or greater.

With respect to FIGS. 1 through 8, the description may omit unnecessary redundant descriptions of components having the same reference numerals and the same functions, and describe possible differences in each drawing.

Figure 2:
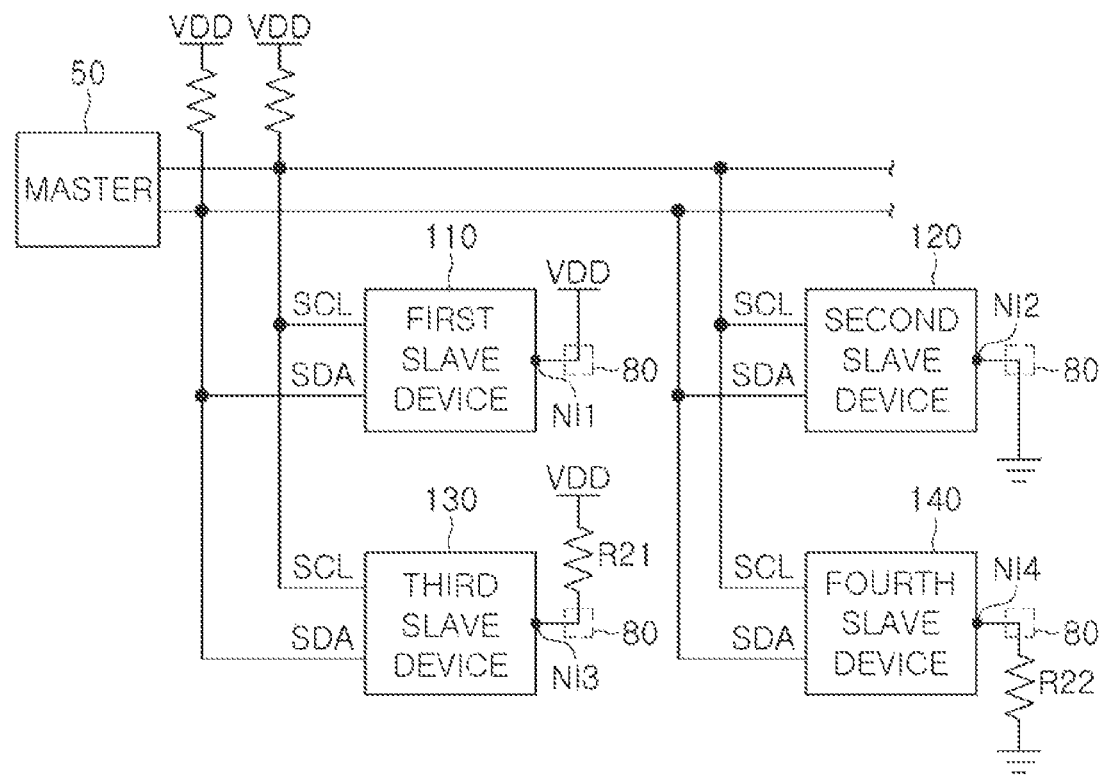
FIG. 2 is a schematic diagram of a slave apparatus, according to an embodiment.

FIG. 2 is a schematic diagram of the slave apparatus 10, according to an embodiment.

Referring to FIG. 2, the slave apparatus 10 may include, for example, a plurality of slave devices by using a serial clock terminal SCL and a serial data terminal SDA of the master device 50 and an inter-integrated circuit 120.

For example, the slave apparatus 10 may include at least three slave devices among four slave devices including a first slave device 110, a second slave device 120, a third slave device 130, and a fourth slave device 140.

In addition, the slave apparatus 10 may further include the pin switch 80 connected to each of the first, second, third, and fourth slave devices 110, 120, 130 and 140.

The pin switch 80 may connect a common terminal Tcom connected to a first single address determination pin NI1 of the first slave device to the first terminal T1 for the first address designation, connect the common terminal Tcom connected to a second single address determination pin NI2 of the second slave device to the second terminal T2 for the second address designation, connect the common terminal Tcom connected to a third single address determination pin NI3 of the third slave device to the third terminal T3 for the third address designation, and connect the common terminal Tcom connected to a fourth single address determination pin NI4 of the fourth slave device to the fourth terminal T4 for the fourth address designation.

The first slave device 110 may include the first single address determination pin NI1 connected to the power terminal VDD by the pin switch 80, may control a voltage level of the first single address determination pin NI1, and may thus designate the first address for performing the serial communications with the master device 50 based on the voltage level of the first single address determination pin NI1.

The second slave device 120 may include the second single address determination pin NI2 connected to the ground terminal GND by the pin switch 80, may control a voltage level of the second single address determination pin NI2, and may thus designate the second address for performing the serial communications with the master device 50 based on the voltage level of the second single address determination pin NI2.

The third slave device 130 may include the third single address determination pin NI3 connected to the power terminal VDD by the pin switch 80 through the first external resistor R21, may control a voltage level of the third single address determination pin NI3, and may thus designate the third address for performing the serial communications with the master device 50 based on the voltage level of the third single address determination pin NI3.

In addition, the fourth slave device 140 may include the fourth single address determination pin NI4 connected to the ground terminal GND by the pin switch 80 through the second external resistor R22, may control a voltage level of the fourth single address determination pin NI4, and may thus designate the fourth address for performing the serial communications with the master device 50 based on the voltage level of the fourth single address determination pin NI4.

Figure 3:
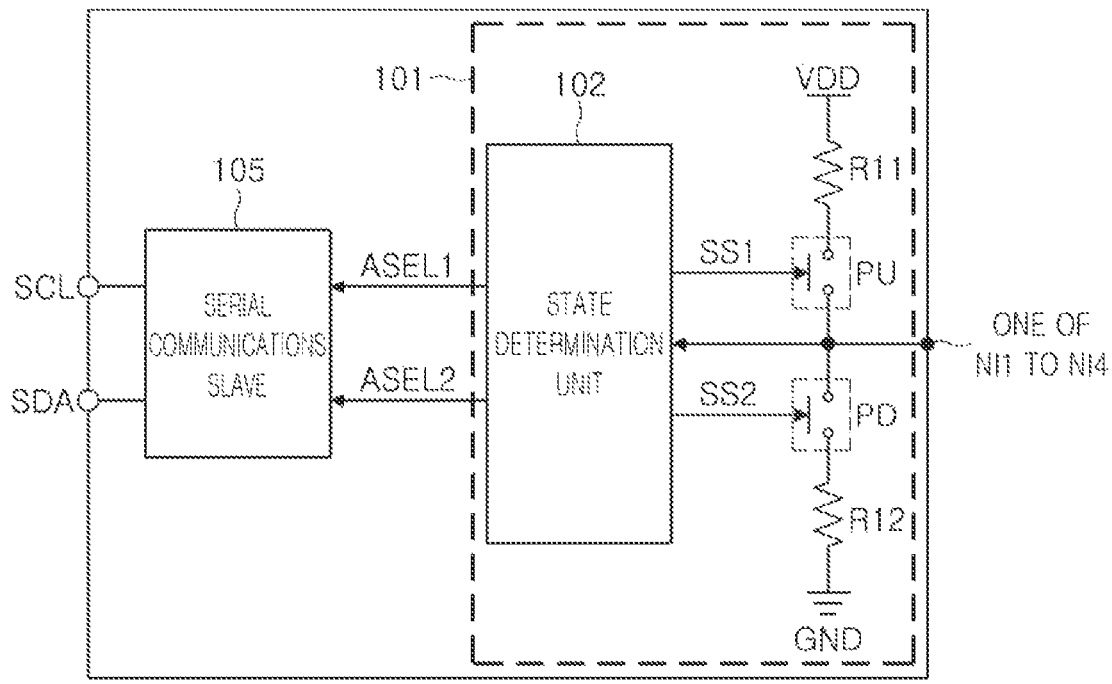
FIG. 3 is a schematic diagram of first to fourth slave devices of FIG. 2.

FIG. 3 is a schematic diagram of first to fourth slave devices 110, 120, 130 and 140, according to an embodiment.

Referring to FIG. 3, each of the first, second, third and fourth slave devices 110, 120, 130 and 140 may include the serial communications slave 105, the respective single address determination pin NI1, NI2, NI3, or NI4, and the address allocation unit 101.

The serial communications slave 105 may include an address allocated by the address allocation unit 101 for performing the serial communications with the master.

The single address determination pin NI may be, selectively, connected to one of the power terminal VDD with no intervening resistance element, connected to the ground terminal GND with no intervening resistance element, connected to the power terminal VDD through the first external resistor R21 or connected to the ground terminal GND through the second external resistor R22.

The address allocation unit 101 may designate the address of the serial communications slave 105 based on the plurality of state bits determined depending on the connection state of the single address determination pin NI1, NI2, NI3, or NI4.

The address allocation unit 101 may include the first internal resistor R11, the second internal resistor R12, the first switch PU, the second switch PD and the state determination unit 102.

One end of the first internal resistor R11 may be connected to the power terminal VDD and the other end thereof may be connected to the first switch PU. For example, the first internal resistor R11 may be the pull-up resistor.

One end of the second internal resistor R12 may be connected to the ground terminal GND and the other end thereof may be connected to the second switch PD. For example, the second internal resistor R12 may be the pull-down resistor.

The first switch PU may be connected between the other end of the first internal resistor R11 and the single address determination pin NI, and may be operated in the ON state or the OFF state based on the control of the state determination unit 102.

The second switch PD may be connected between the other end of the second internal resistor R12 and the single address determination pin NI, and may be operated in the ON state or the OFF state based on the control of the state determination unit 102.

In addition, the state determination unit 102 may control the first switch PU and the second switch PD, and designate the address based on the voltage level of the single address determination pin NI determined based on the control. A more detailed description of operation of the state determination unit 102 is provided below.

The state determination unit 102 may sequentially control the first and second switches PU and PD by using the first and second control signals SS1 and SS2, and sequentially read the voltage levels of the respective single address determination pin NI1, NI2, NI3, or NI4) to set the first, second and third state bits. The description below describes an operation in which the first, second and third state bits are set.

Next, the state determination unit 102 may set the voltage levels of the first and second address selection signals ASEL1 and ASEL2 for designating the address of the serial communications slave 105 based on the first, second, and third state bits based on the read voltage levels of the respective single address determination pin NI1, NI2, NI3, or NI4.

FIG. 4 is a schematic diagram of the first and second address selection signals for designating a first address, a second address, a third address and a fourth address based on the voltage state of the single address determination pin (external pin), according to an embodiment.

Referring to FIGS. 1, 3 and 4, in order to designate the address, as described above, the state determination unit 102 may first control the first and second switches PU and PD in the OFF-OFF state by using the first and second control signals SS1 and SS2 and read the voltage level of the single address determination pin NI (or one of NI1, NI2, NI3 and NI4) to set the first state bit, secondarily control the first and second switches PU and PD in the ON-OFF state and read the voltage level of the single address determination pin NI (or one of NI1, NI2, NI3 and NI4) to set the second state bit, and thirdly control the first and second switches PU and PD in the OFF-ON state and read the voltage level of the single address determination pin NI to set the third state bit.

Next, the state determination unit 102 may set the voltage levels of the first and second address selection signals ASEL1 and ASEL2 for designating the address of the serial communications slave 105 based on the first, second and third state bits based on the read voltage levels of the single address determination pin NI (or one of NI1, NI2, NI3 and NI4).

Referring to FIG. 4, for example, to designate the first address, the common terminal Tcom connected to the single address determination pin NI1, NI2, NI3, or NI4 (hereafter, "NI," for conciseness) may be connected to the first terminal T1, the first and second switches PU and PD may be sequentially controlled by using the first and second control signals SS1 and SS2, when the first, second and third state bits become "1,1,1", the voltage levels of the first and second address selection signals ASEL1 and ASEL2 may be "0,0", and the corresponding serial communications slave 105 may thus designate the first address.

As another example, to designate the second address, the common terminal Tcom connected to the single address determination pin NI may be connected to the second terminal T2, the first and second switches PU and PD may be sequentially controlled by using the first and second control signals SS1 and SS2, when the first, second and third state bits become "0,0,0", the voltage levels of the first and second address selection signals ASEL1 and ASEL2 may be "0,1", and the corresponding serial communications slave 105 may thus designate the second address.

As another example, to designate the third address, the common terminal Tcom connected to the single address determination pin NI may be connected to the third terminal T3, the first and second switches PU and PD may be sequentially controlled by using the first and second control signals SS1 and SS2, when the first, second and third state bits become "1,1,0", the voltage levels of the first and second address selection signals ASEL1 and ASEL2 may be "1,0", and the corresponding serial communications slave 105 may thus designate the third address.

In addition, as another example, to designate the fourth address, the common terminal Tcom connected to the single address determination pin NI may be connected to the fourth terminal T4, the first and second switches PU and PD may be sequentially controlled by using the first and second control signals SS1 and SS2, when the first, second and third state bits become "0,1,0", the voltage levels of the first and second address selection signals ASEL1 and ASEL2 may be "1,1", and the corresponding serial communications slave 105 may thus designate the fourth address.

With respect to FIGS. 3 through 8 of the present disclosure, the description may omit unnecessary redundant descriptions of components having the same reference numerals and the same functions, and describe possible differences in each drawing.

Figure 5:
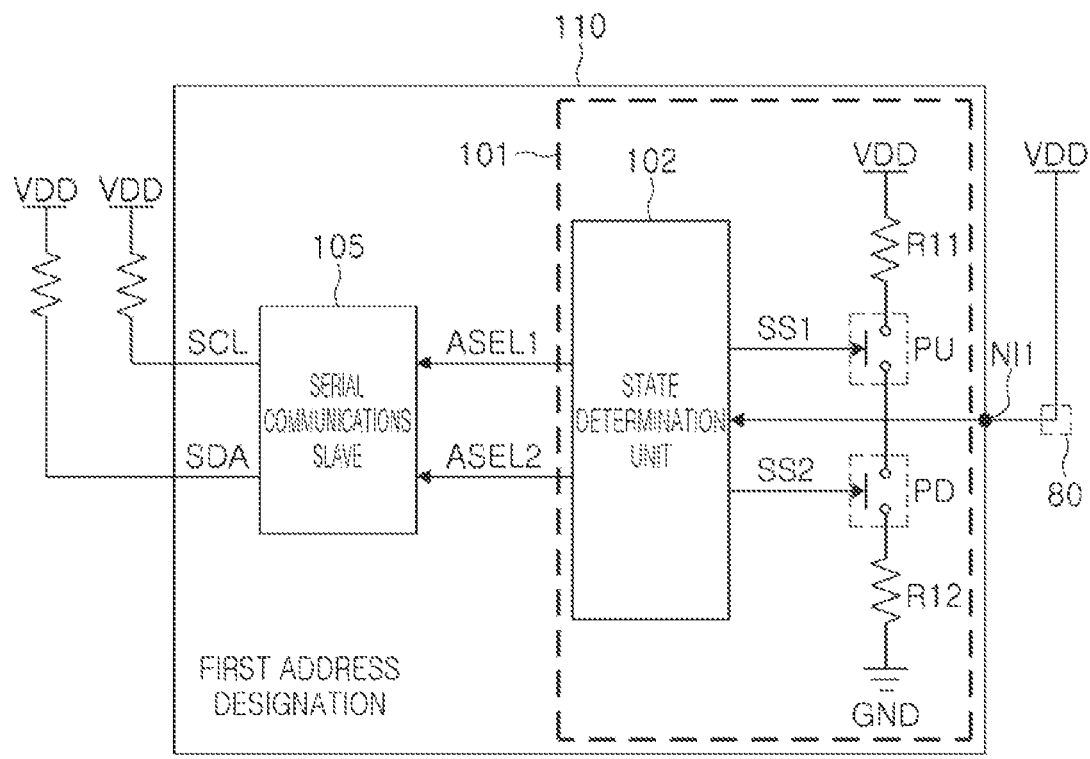
FIG. 5 is a schematic diagram of the first slave device in which the first address is designated, according to an embodiment.

FIG. 5 is a schematic diagram of the first slave device 110, in which the first address is designated.

Referring to FIG. 5, the single address determination pin NI1 of the first slave device 110 may be connected to the power terminal VDD by the pin switch 80 to designate the first address.

For example, in FIG. 5, when the state determination unit 102 controls both the first switch PU and the second switch PD to be in the OFF state by using the first and second control signals SS1 and SS2, the voltage level of the single address determination pin NI may become a logic "1" corresponding to the VDD. When the state determination unit 102 controls the first switch PU to be in the ON state and the second switch PD to be in the OFF state, the voltage level of the single address determination pin NI1 may become the logic "1" corresponding to the VDD; and when the state determination unit 102 controls the first switch PU to be in the OFF state and the second switch PD to be in the ON state, the voltage level of the single address determination pin NI may become the logic "1" corresponding to the VDD.

Accordingly, if the voltage levels of the single address determination pin NI sequentially correspond to the logic levels "1,1,1", the state determination unit 102 may set the first and second address selection signals ASEL1 and ASEL2 to the logic levels "0,0" corresponding to the first address.

Figure 6:
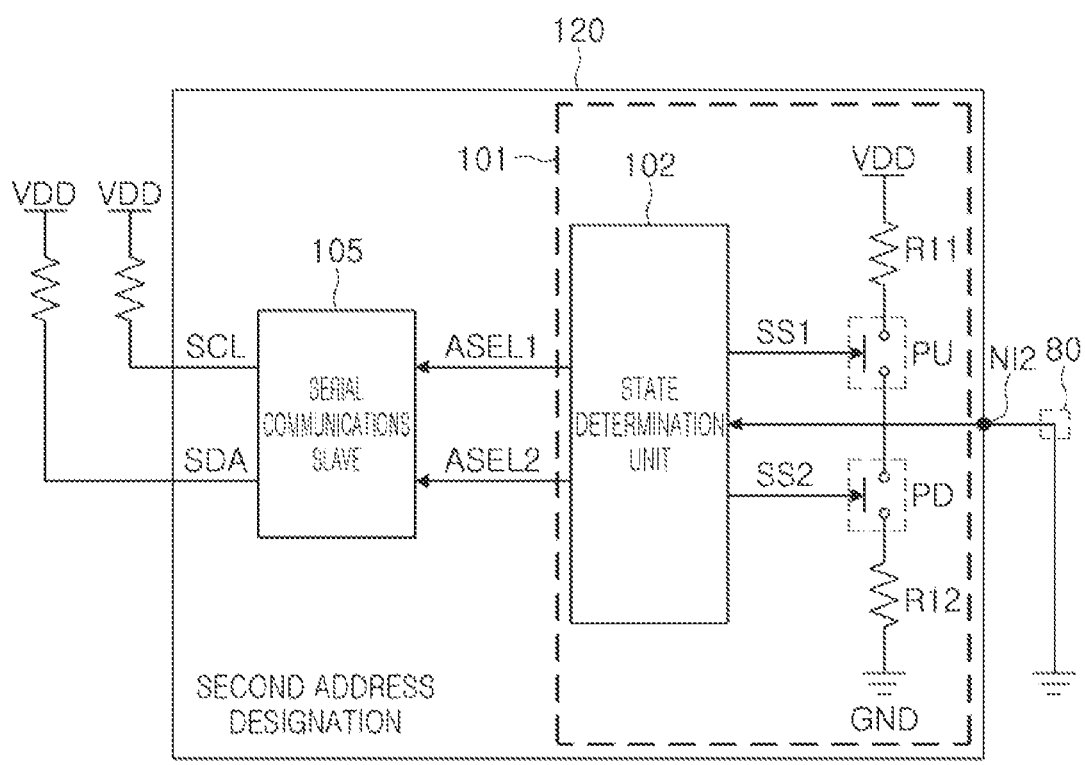
FIG. 6 is a schematic diagram of the second slave device in which the second address is designated, according to an embodiment.

FIG. 6 is a schematic diagram of the second slave device 120, in which the second address is designated.

Referring to FIG. 6, the second single address determination pin NI2 of the second slave device 120 may be connected to the ground terminal GND by the pin switch 80 to designate the second address.

For example, in FIG. 6, if the state determination unit 102 controls both the first switch PU and the second switch PD to be in the OFF state by using the first and second control signals SS1 and SS2, the voltage level of the single address determination pin NI may become a logic "0" corresponding to a GND level; when the state determination unit 102 controls the first switch PU to be in the ON state and the second switch PD to be in the OFF state, the voltage level of the single address determination pin NI may become the logic "0" corresponding to the GND level; and when the state determination unit 102 controls the first switch PU to be in the OFF state and the second switch PD to be in the ON state, the voltage level of the single address determination pin NI may become the logic "0" corresponding to the GND level.

Accordingly, if the voltage levels of the second single address determination pin NI2 sequentially correspond to the logic levels "0,0,0", the state determination unit 102 may set the first and second address selection signals ASEL1 and ASEL2 to the logic levels "0,1".

Figure 7:
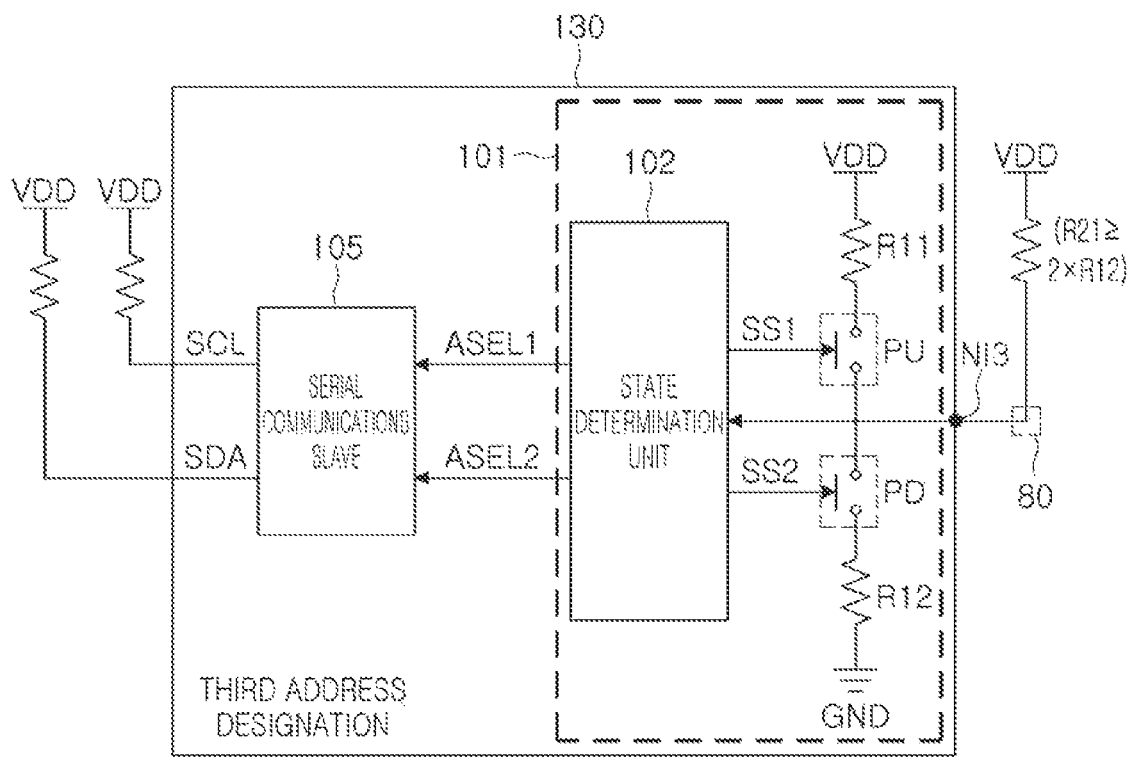
FIG. 7 is a schematic diagram of the third slave device in which the third address is designated, according to an embodiment.

FIG. 7 is a schematic diagram of the third slave device 130, in which the third address is designated.

Referring to FIG. 7, the third single address determination pin NI3 of the third slave device 130 may be connected to the power terminal VDD by the pin switch 80 through the first external resistor R21 to designate the third address.

For example, the first external resistor R21 may have the resistance value that is twice the resistance value of the second internal resistor R12 or greater.

For example, in FIG. 7, when the state determination unit 102 controls both the first switch PU and the second switch PD to be in the OFF state by using the first and second control signals SS1 and SS2, the first external resistor R21 may function as the pull-up resistor, and the voltage level of the single address determination pin NI may thus become the logic "1" corresponding to the VDD; when the state determination unit 102 controls the first switch PU to be in the ON state and the second switch PD to be in the OFF state, the first external resistor R21 and the first internal resistor R11 may function as the pull-up resistors, and the voltage level of the single address determination pin NI may thus become the logic "1" corresponding to the VDD; and when the state determination unit 102 controls the first switch PU to be in the OFF state and the second switch PD to be in the ON state, the first external resistor R21 may have the resistance value that is twice or more than the resistance value of the second internal resistor R12, a voltage of "VDD/3" may thus be applied to the second internal resistor R12 to lower the voltage level distributed to the second internal resistor R12 for example, and the voltage level of the single address determination pin NI may thus become the logic "0" corresponding to the low level.

Accordingly, if the voltage levels of the single address determination pin NI3 sequentially correspond to the logic levels "1,1,0", the state determination unit 102 may set the first and second address selection signals ASEL1 and ASEL2 to the logic levels "1,0".

The higher the resistance value of the first external resistor R21 than the resistance value of the second internal resistor R12, the more advantageous the resistance values of the first external resistor R21 and the second internal resistor R12 may be to obtain a stable logic value. However, the greater resistance value of the first external resistor R21, the greater the pull-up resistance becomes, and thus a transition time of the voltage applied to the single address determination pin NI increases, thereby requiring a long time to determine the state. Accordingly, it may be necessary to select appropriate resistance values for the first external resistor R21 and the second internal resistor R12.

Figure 8:
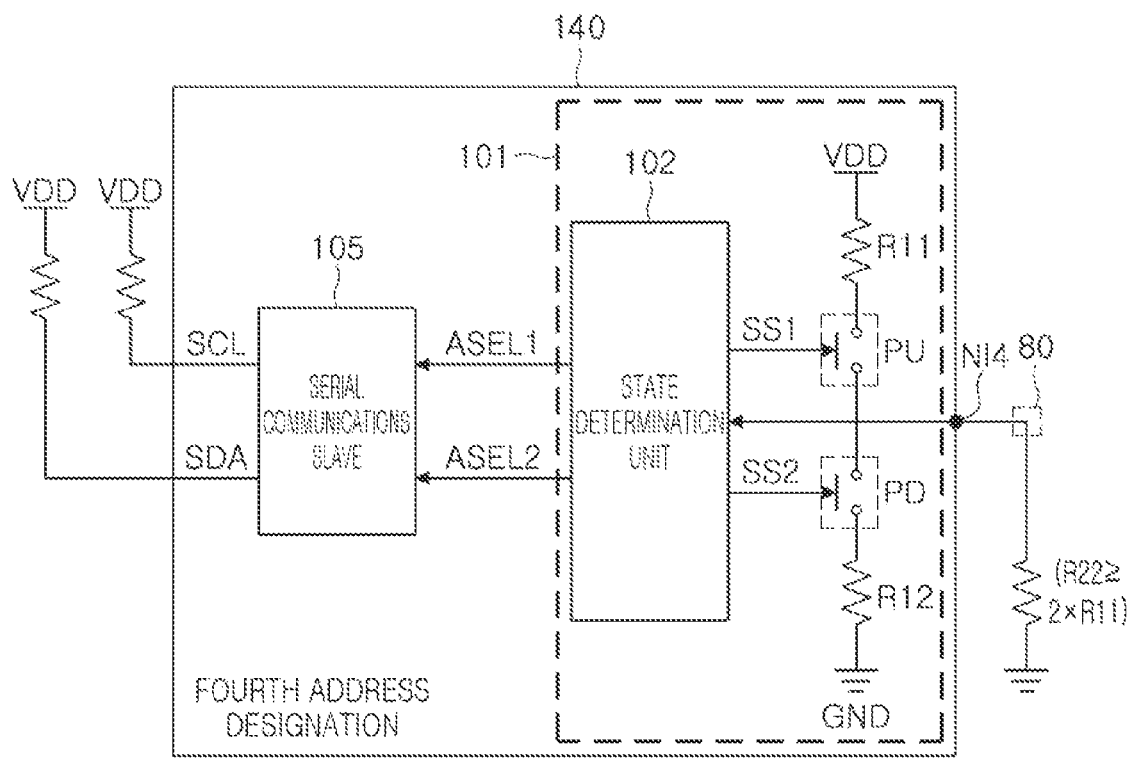
FIG. 8 is a schematic diagram of the fourth slave device in which the fourth address is designated, according to an embodiment.

FIG. 8 is a schematic diagram of the fourth slave device 140, in which the fourth address is designated.

Referring to FIG. 8, the fourth single address determination pin NI4 of the fourth slave device 140 may be connected to the ground terminal GND by the pin switch 80 through the second external resistor R22 to designate the fourth address.

For example, the second external resistor R22 may be set to have the resistance value that is twice the resistance value of the first internal resistor R11 or greater.

For example, in FIG. 8, when the state determination unit 102 controls both the first switch PU and the second switch PD to be in the OFF state by using the first and second control signals SS1 and SS2, the second external resistor R22 may function as the pull-down resistor, and the voltage level of the single address determination pin NI may thus become the logic "0" corresponding to the GND level; when the state determination unit 102 controls the first switch PU to be in the ON state and the second switch PD to be in the OFF state, the second external resistor R22 may have the resistance value that is twice or more than the resistance value of the first internal resistor R11, a voltage of "(2*VDD)/3" may thus be applied to the second external resistor R22 to increase the voltage level distributed to the second external resistor R22 for example, and the voltage level of the single address determination pin NI may thus become the logic "1" corresponding to the high level; and when the state determination unit 102 controls the first switch PU to be in the OFF state and the second switch PD to be in the ON state, the second external resistor R22 and the second internal resistor R12 may function as the pull-down resistors, and the voltage level of the single address determination pin NI may thus become the logic "0" corresponding to the GND level.

Accordingly, if the voltage levels of the fourth single address determination pin NI4 sequentially correspond to the logic levels "0,1,0", the state determination unit 102 may set the first and second address selection signals ASEL1 and ASEL2 to the logic levels "1,1".

As set forth above, it is possible to connect up to four slave devices for 120 communications with one another using a single external pin, and respectively allocate different addresses to the slave devices, thereby making it possible for one master device to communicate with up to four slave devices by one input.

According to embodiments disclosed herein, it is possible to designate the addresses to up to four slave apparatuses using the single external pin (single address determination pin).

The master 50, the serial communications slave 105, and the state determination unit 102 in FIGS. 1 to 8 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1 to 8 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A slave device, comprising:
a serial communications slave having an address designated for performing serial communications with a master;
a pin switch, wherein the pin switch includes a single address determination pin configured to be, selectively, connected to one of a power terminal, a ground terminal, the power terminal through a first external resistor, or the ground terminal through a second external resistor; and
an address allocator configured to designate the address of the serial communications slave based on a plurality of state bits determined depending on a connection state of the single address determination pin, wherein the address allocator includes
a first internal resistor having one end connected to the power terminal,
a second internal resistor having one end connected to the ground terminal,
a first switch connected between another end of the first internal resistor and the single address determination pin, and
a second switch connected between another end of the second internal resistor and the single address determination pin.

2. The slave device of claim 1, wherein the address allocator further includes:
a state determiner configured to control the first switch and the second switch, and designate the address based on a voltage level of the single address determination pin that is determined based on the control of the first switch and the second switch.

3. The slave device of claim 2, wherein the state determiner is further configured to:
firstly, control the first and second switches to be in an OFF-OFF state by using first and second control signals and read the voltage level of the single address determination pin;
secondly, control the first and second switches to be in an ON-OFF state and read the voltage level of the single address determination pin;
thirdly, control the first and second switches to be in an OFF-ON state and read the voltage level of the single address determination pin; and
fourthly, set voltage levels of first and second address selection signals for designating the address based on the read voltage level of the single address determination pin.

4. The slave device of claim 3, wherein, in a state in which the single address determination pin is connected to the power terminal to designate a first address, and in response to the voltage level of the single address determination pin sequentially corresponding to logic levels "1,1,1", the state determiner sets the first and second address selection signals to logic levels "0,0" corresponding to the first address.

5. The slave device of claim 3, wherein, in a state in which the single address determination pin is connected to the ground terminal to designate a second address, and in response to the voltage level of the single address determination pin sequentially corresponding to logic levels "0,0,0", the state determiner sets the first and second address selection signals to logic levels "0,1" corresponding to the second address.

6. The slave device of claim 3, wherein, in a state in which the single address determination pin is connected to the power terminal through the first external resistor to designate a third address, and in response to the voltage level of the single address determination pin sequentially corresponding to logic levels "1,1,0", the state determiner sets the first and second address selection signals to logic levels "1,0" corresponding to the third address, and
the first external resistor has a resistance value that is greater than or equal to twice a resistance value of the second internal resistor.

7. The slave device of claim 3, wherein, in a state in which the single address determination pin is connected to the ground terminal through the second external resistor to designate a fourth address, and in response to the voltage level of the single address determination pin sequentially corresponding to logic levels "0,1,0", the state determiner sets the first and second address selection signals to logic levels "1,1", and wherein the second external resistor has a resistance value that is greater than or equal to twice a resistance value of the first internal resistor.

8. A slave apparatus comprising:
a pin switch configured to connect to at least three among four single address determination switches, the four single address determination switches including
a first single address determination pin connected to a power terminal,
a second single address determination pin connected to a ground terminal,
a third single address determination pin connected to the power terminal through a first external resistor, and
a fourth single address determination pin connected to the ground terminal through a second external resistor; and
at least three among four slave devices, the four slave devices including:
a first slave device including the first single address determination pin, wherein the first slave device is configured to control a voltage level of the first single address determination pin, and designate a first address for performing serial communications with a master based on the voltage level of the first single address determination pin;
a second slave device including the second single address determination pin, wherein the second slave device is configured to control a voltage level of the second single address determination pin, and designate a second address for performing the serial communications with the master based on the voltage level of the second single address determination pin;
a third slave device including the third single address determination pin, wherein the third slave device is configured to control a voltage level of the third single address determination pin, and designate a third address for performing the serial communications with the master based on the voltage level of the third single address determination pin; and
a fourth slave device including the fourth single address determination pin, wherein the fourth slave device is configured to control a voltage level of the fourth single address determination pin, and designate a fourth address for performing the serial communications with the master based on the voltage level of the fourth single address determination pin.

9. The slave apparatus of claim 8, wherein each of the first, second, third, and fourth slave devices includes:
a serial communications slave having an address is designated for performing the serial communications with the master; and
an address allocator configured to designate the address of the serial communications slave based on a plurality of state bits determined depending on a connection state of a corresponding one of the first, second, third, and fourth single address determination pins.

10. The slave apparatus of claim 9, wherein the address allocator includes:
the first internal resistor;
the second internal resistor;
a first switch connected between another end of the first internal resistor and the corresponding one of the first, second, third, and fourth single address determination pins;

a second switch connected between the other end of the second internal resistor and the corresponding one of the first, second, third, and fourth single address determination pins; and
a state determiner configured to control the first switch and the second switch, and designate the address based on the voltage level of the corresponding one of the first, second, third, and fourth single address determination pins, the voltage level of the corresponding one of the first, second, third, and fourth single address determination pins being determined based on the control of the first switch and the second switch.

11. The slave apparatus of claim 10, wherein the state determiner is further configured to:
firstly, control the first and second switches to be in an OFF-OFF state and read the voltage level of the corresponding one of the first, second, third, and fourth single address determination pins;
secondly, control the first and second switches to be in an ON-OFF state and read the voltage level of the corresponding one of the first, second, third, and fourth single address determination pins;
thirdly, control the first and second switches to be in an OFF-ON state and reads the voltage level of the corresponding one of the first, second, third, and fourth single address determination pins; and
fourthly, set voltage levels of first and second address selection signals for designating the address based on the read voltage level of the corresponding one of the first, second, third, and fourth single address determination pins.

12. The slave apparatus of claim 11, wherein the state determiner sets the first and second address selection signals to logic levels "0,0", in response to the voltage level of the first single address determination pin sequentially corresponding to logic levels "1,1,1".

13. The slave apparatus of claim 11, wherein the state determiner sets the first and second address selection signals to logic levels "0,1", in response to the voltage level of the second single address determination pin sequentially corresponding to logic levels "0,0,0".

14. The slave apparatus of claim 11, wherein the state determiner sets the first and second address selection signals to logic levels "1,0", in response to the voltage level of the third single address determination pin sequentially corresponding to logic levels "1,1,0", and
wherein the first external resistor has a resistance value that is greater than or equal to twice a resistance value of the second internal resistor.

15. The slave apparatus of claim 11, wherein the state determiner sets the first and second address selection signals to logic levels "1,1", in response to the voltage level of the fourth single address determination pin sequentially corresponding to logic levels "0,1,0", and
wherein the second external resistor has a resistance value that is greater than or equal to twice a resistance value of the first internal resistor.

16. The slave apparatus of claim 9, wherein the pin switch is connected to each of the first, second, third and fourth slave devices,
wherein the pin switch connects a common terminal connected to the first single address determination pin to a first terminal for a first address designation, connects a common terminal connected to the second single address determination pin to a second terminal for a second address designation, connects a common terminal connected to the third single address determination pin to a third terminal for a third address designation, and connects a common terminal connected to the fourth single address determination pin to a fourth terminal for a fourth address designation, and wherein the first terminal is connected to the power terminal, the second terminal is connected to the ground terminal, the third terminal is connected to the power terminal through the first external resistor, and the fourth terminal is connected to the ground terminal through the second external resistor.

17. A slave device, comprising:
a serial communications slave having an address designated for performing serial communications with a master;
a single address determination pin; and
a pin switch including:
  a common terminal connected to the single address determination pin;
  a first terminal connected to a power terminal;
  a second terminal connected to a ground terminal;
  a third terminal connected to the power terminal through a first external resistor;
  a fourth terminal connected to the ground terminal through a second external resistor,
  a first switch connected between an end of a first internal resistor connected to the power terminal and the single address determination pin, and
  a second switch connected between an end of a second internal resistor connected to the ground terminal and the single address determination pin,
wherein the slave device is configured to designate the address of the serial communications slave based on a plurality of state bits determined depending on connection states of the common terminal with respect to the first terminal, the second terminal, third terminal, and the fourth terminal.

18. The slave device of claim 17, wherein no resistor is disposed in a path connecting the first terminal to the power terminal, and no resistor is disposed in a path connecting the second terminal to the ground terminal.

19. The slave device of claim 17, wherein the slave device is further configured to selectively connect the common terminal to each of the first terminal, the second terminal, third terminal, and the fourth terminal.

20. The slave device of claim 17, further comprising:
a first switch connected to the first internal resistor and the single address determination pin; and
a second switch connected to the second internal resistor and the single address determination pin,
wherein the slave device is further configured to configured to control the first switch and the second switch to vary a voltage level of the single address determination pin, and designate the address based on the voltage level.

* * * * *